(12) United States Patent
Kucer et al.

(10) Patent No.: US 12,194,582 B2
(45) Date of Patent: Jan. 14, 2025

(54) METHOD AND APPARATUS FOR ASSEMBLING SPLINED FRAME ITEMS

(71) Applicant: Haffner Machinery Inc., Montreal (CA)

(72) Inventors: Stephen Kucer, Montreal (CA); Cemil Bulduk, Istanbul (TR)

(73) Assignee: Haffner Machinery Inc., Hampstead (CA)

( * ) Notice: Subject to any disclaimer, the term of this patent is extended or adjusted under 35 U.S.C. 154(b) by 254 days.

(21) Appl. No.: 17/813,386

(22) Filed: Jul. 19, 2022

(65) Prior Publication Data

US 2023/0023555 A1   Jan. 26, 2023

Related U.S. Application Data

(60) Provisional application No. 63/225,866, filed on Jul. 26, 2021.

(51) Int. Cl.
*B23P 19/04* (2006.01)
*B23P 19/00* (2006.01)
*E06B 9/52* (2006.01)

(52) U.S. Cl.
CPC .......... *B23P 19/047* (2013.01); *B23P 19/006* (2013.01); *E06B 9/52* (2013.01)

(58) Field of Classification Search
CPC ......... B23P 19/047; B23P 19/006; E06B 9/52
See application file for complete search history.

(56) References Cited

U.S. PATENT DOCUMENTS 6,470,562 B1 * 10/2002 Simone ................... B21F 33/02
29/709

\* cited by examiner

*Primary Examiner* — Daniel McNally
(74) *Attorney, Agent, or Firm* — Rowan TELS LLC

(57) ABSTRACT

A frame splining system for fitting substrate to a frame comprises a splining head that translates in three dimensions and rotates around a vertical axis. The splining head comprises a positioning wheel that translates ahead of a pressing wheel along a track of the frame to seat a spline in the track. A substrate cutting wheel runs ahead of the pressing wheel on an outer edge of the frame.

15 Claims, 10 Drawing Sheets

METHOD AND APPARATUS FOR ASSEMBLING SPLINED FRAME ITEMS

CROSS-REFERENCE TO RELATED APPLICATIONS

This application claims the benefit of U.S. provisional patent application Ser. No. 63/225,866, filed on Jul. 26, 2021, the contents of which are incorporated herein by reference in their entirety.

BACKGROUND

Splined frame devices such as window screens are conventionally assembled by hand, with the assembler stretching a mesh, film, or another flexible substrate across a frame, and anchoring the substrate to the frame by pressing a spline into a track running along the frame, such that the substrate is pushed into the track along with the spline and pinned against the sides of the track by the spline. The assembler may then cut away the excess substrate with a knife.

This manual assembly process takes the expertise of a skilled assembler to create assembled frames that are of a quality and consistency that meets standards for durability suitable to the construction industry. Such repetitive labor is time-consuming and may have adverse health effects on those employed in assembling dozens to hundreds of frames within a day's shift. Potential health and safety risks include repetitive stress injuries and knife cuts.

In addition, knife slips when cutting excess substrate may cause damage to the frame under assembly. Such damage may range from mere scratches that impact the aesthetics of the assembled frame to bends, dents, and gouges that may impact the durability, energy efficiency, and ease of installation of the frame.

Conventional automated solutions for assembling splined frames may perform only some of the steps of a manual assembler. Full assembly may still require human intervention. There is, therefore, a need for a frame splining system that performs all of the steps needed to assemble a splined frame screen or panel, eliminating the need for manual assembly.

BRIEF SUMMARY

In one aspect, a splining head assembly apparatus includes a splining head, and a spline feeding mechanism configured to feed a spline to the splining head. The splining head includes a positioning wheel configured to position the spline along a track in a frame overlaid with a substrate, a substrate cutting wheel configured to cut the substrate along an outer edge of the frame, and a pressing wheel configured to press the spline and the substrate into the track in the frame. The splining head is configured such that the positioning wheel and the substrate cutting wheel run ahead of the pressing wheel on the outer edge of the frame, and where the positioning wheel and the substrate cutting wheel are configured to be coaxial, such that the spline is positioned and the substrate is cut at the same time.

In one aspect, a frame splining system, includes a work surface configured to receive and support a frame having a track for spline. The frame splining system also includes at least one frame securement clamp configured to hold the frame immobile against the work surface. The frame splining system also includes a splining head assembly apparatus, as disclosed above, that includes a splining head and a spline feeding mechanism configured to feed the spline to the splining head.

In one aspect, a method includes positioning a splining head, such as disclosed above, over a track within a frame covered with a substrate, feeding a spline to the splining head via a spline feeding mechanism, positioning the spline along the track using the positioning wheel, cutting the substrate along an outer edge of the frame using the substrate cutting wheel, pressing the spline and the substrate into the track using the pressing wheel, and cutting the spline with a spline cutter when an end of a portion of the track is reached.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
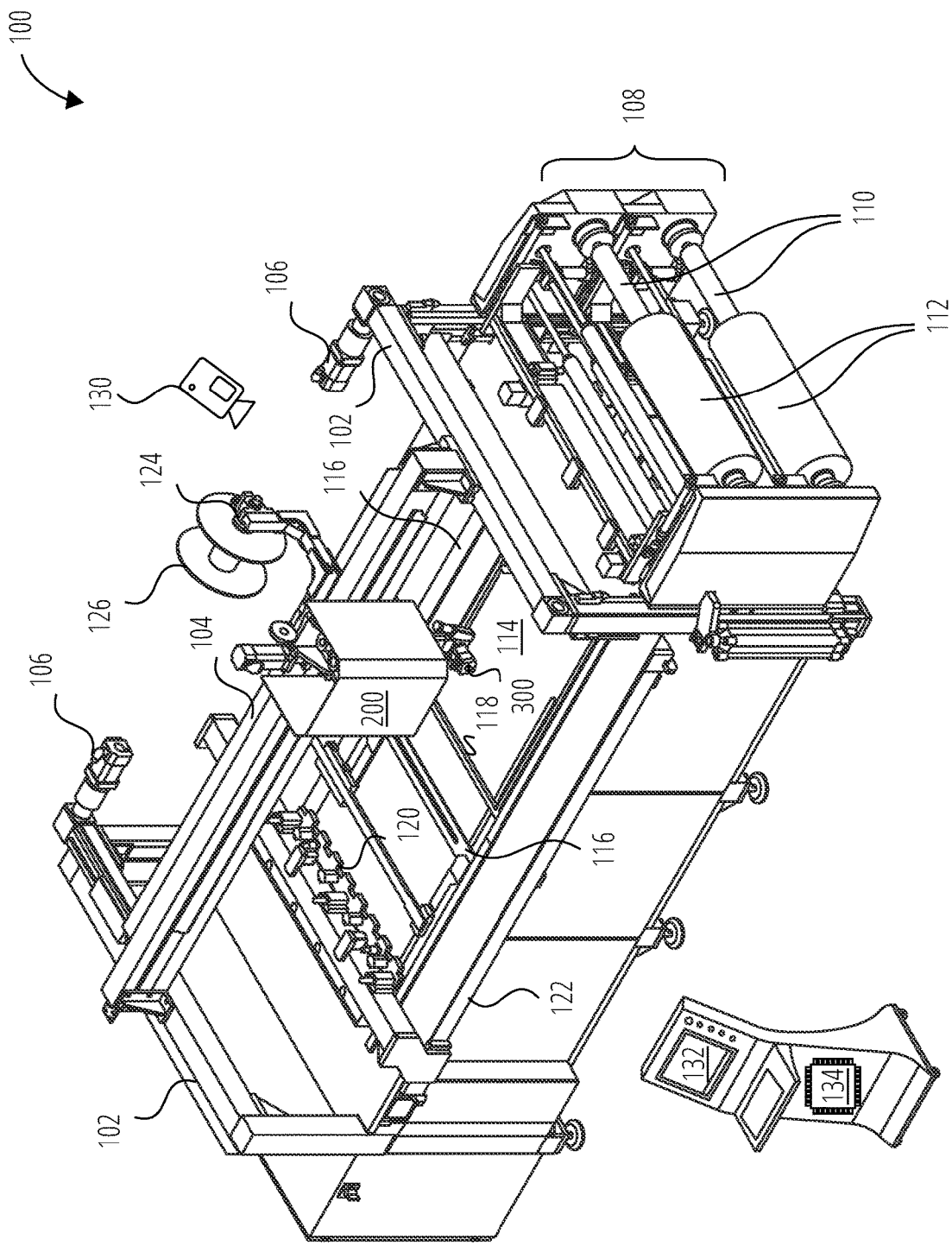
FIG. 1A depicts an isometric view of a frame splining system 100 in accordance with one embodiment.

Embodiments of a frame splining system apparatus and method for fitting substrate onto a frame to form a screen are described. The frame splining system may comprise a splining head assembly apparatus suspended from a longitudinal gantry. The splining head assembly apparatus may comprise a splining head configured to position and press a spline into a track configured in a frame. The splining head assembly apparatus may traverse along the longitudinal gantry under influence of a splining head drive motor, and transversely along lateral gantries under influence of a gantry drive motor. This may allow the splining head to traverse the entire periphery of the frame. The splining head may also rotate around a vertical axis in order to traverse the corners of the frame. The splining head may further traverse vertically to engage and disengage from the frame.

The splining head comprises a feed from the spline spool, a positioning wheel, a substrate cutting wheel, a pressing wheel, and a spline cutter. The splining head maneuvers to position an end of the spline above a track running around the perimeter of the frame. The track has an outer edge that is the edge more distal from the center axis of the frame. The positioning wheel presses the spline part-way into the track. The substrate cutting wheel simultaneously cuts the substrate adjacent to the spline along the outer edge of the track. As the splining head traverses along the track, positioning the spine and cutting the substrate, the pressing wheel runs behind the positioning wheel and the substrate cutting wheel. The pressing wheel is of a greater radius or has a lower central axis, such that it presses the spline more deeply into the track of the frame. The action of the pressing wheel seats the spline into its final position and causes the cut edge of the substrate to retract into the track. When the desired length of spline has been fitted into the track, the spline cutter (e.g., a solenoid-actuated blade) is engaged to cut the length of spline, the final end of which is pressed into the track. When approaching each corner, the splining head lifts up to disengage the pressing wheel from the track, then rotates ninety degrees to bend the spline around the corner and into the track, repeating this process for each corner of the frame.

A barcode, a quick response (QR) code, or other indicator (e.g., serial number or other informational label) on the frame to be screened may be scanned, or the frame may be otherwise analyzed, providing the frame splining system with the frame dimensions. The frame splining system may comprise a substrate carousel of substrate spool pins of different widths supporting one or more substrate spools. Based on the frame dimensions indicated by the barcode, the frame splining system may adjust the substrate carousel so that the appropriate substrate spool is aligned with the work surface, and the substrate thereon may be engaged by the grabbing bar for fitting onto the frame. The grabbing bar may utilize air pistons to pinch and hold an edge of the substrate while drawing the substrate off of the substrate spool across the frame on the work surface.

Clamps may be utilized to engage the frame to hold it securely in place on the work surface, preventing movement in any direction. The clamps may be automatically positioned based on the scanned size of the frame.

FIG. 1A depicts an isometric view of a frame splining system 100 in one embodiment. The frame splining system 100 may comprise lateral gantries 102, a longitudinal gantry 104, and a gantry drive motor 106 for positioning a splining head assembly apparatus 200 that includes a spline spool pin 124 holding a spline spool 126, and a splining head 300. The frame splining system 100 may further comprise a substrate carousel 108 including one or more substrate spool pins 110 holding one or more substrate spools 112. The frame splining system 100 may comprise a work surface 114 configured to receive and support a frame 118, and frame securement clamps 116 for securing the frame in place. The frame splining system 100 may comprise a grabbing bar 120 configured to traverse the work surface 114 along grabbing bar rails 122 in order to grab hold of the substrate from one of the substrate spools 112 of the substrate carousel 108. Finally, the frame splining system 100 may be controlled via a control station 132.

In one embodiment, the splining head assembly apparatus 200 may be moved across the horizontal plane by the action of the gantry drive motor 106, which may propel the longitudinal gantry 104 across the lateral gantries 102, as well as by the action of a splining head drive motor (illustrated with respect to FIG. 2) which may propel the splining head assembly apparatus 200 along the longitudinal gantry 104. In this manner, the splining head assembly apparatus 200 may be moved along the track of a frame 118 positioned on the work surface 114, such that the splining head 300 (illustrated in greater detail with respect to FIG. 3B and FIG. 3C) may position spline within the track so as to anchor substrate to the frame.

The frame splining system 100 may in one embodiment include a substrate carousel 108 containing more than one substrate spool pin 110. This substrate carousel 108 may allow multiple substrate spools 112 to be selected for use. For example, substrates 136 of different widths may be mounted within the substrate carousel 108. In one embodiment, the frame splining system 100 may include a scanning device 130 capable of scanning a frame 118 on the work surface 114 for a barcode, a quick response (QR) code, or some other dimension-indicating label. The scanning device 130 may be able to capture an image of the frame and may do so alongside a measuring scale. The scanning device 130 may communicate with and provide input to a controller capable of determining the frame dimensions from the scanned data. The controller 134 may in one embodiment reside in the control station 132.

The frame splining system 100 may thus be configured to automatically select a spool holding an appropriately sized substrate from among the substrate spools 112 in the substrate carousel 108 based on the frame dimensions so detected. The splining head assembly apparatus 200 may be manipulated in three dimensions over the work surface 114 to engage with a frame 118 based on the frame dimensions detected via the scanning device 130.

Figure 1B:
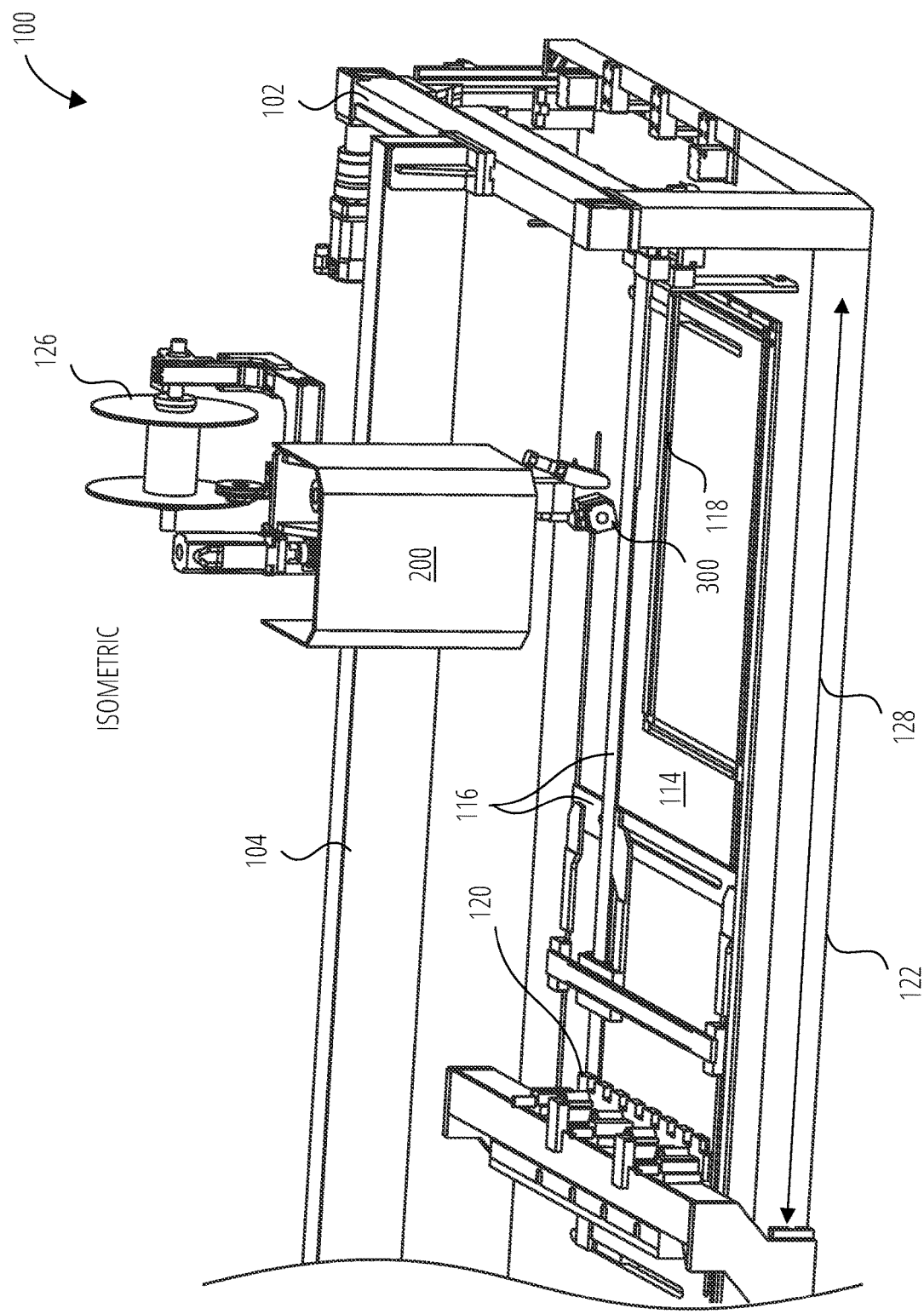
FIG. 1B depicts an isometric detail view of a frame splining system 100 in accordance with one embodiment.

FIG. 1B depicts an isometric detail view of a frame splining system 100 in accordance with one embodiment. The work surface 114 and frame 118 may be seen more clearly, along with the frame securement clamps 116, which may traverse the work surface 114 to contact the edges of the frame 118 in order to hold the frame 118 immobile against the work surface 114 as the splining head assembly apparatus 200 splines the frame.

The grabbing bar 120 may also be seen more clearly. An arrow indicates the grabbing bar motion 128 along the grabbing bar rail 122. The grabbing bar motion 128 along the grabbing bar rail 122 may carry the grabbing bar 120 toward the substrate carousel 108 shown in FIG. 1A. The grabbing bar 120 may advance along the grabbing bar rail 122, and, when proximate to the substrate carousel 108, grab onto a free edge of substrate wound on a substrate spool 112 (shown in FIG. 1A).

The grabbing bar 120 may use a pinching or gripping contact to engage the substrate. In one embodiment, where the substrate is a mesh, the grabbing bar 120 may use a hooking feature to engage with the mesh. Once engaged with the substrate, the grabbing bar 120 may withdraw along the grabbing bar rail 122 in order to pull the substrate across frame 118 residing on the work surface 114.

Figure 1C:
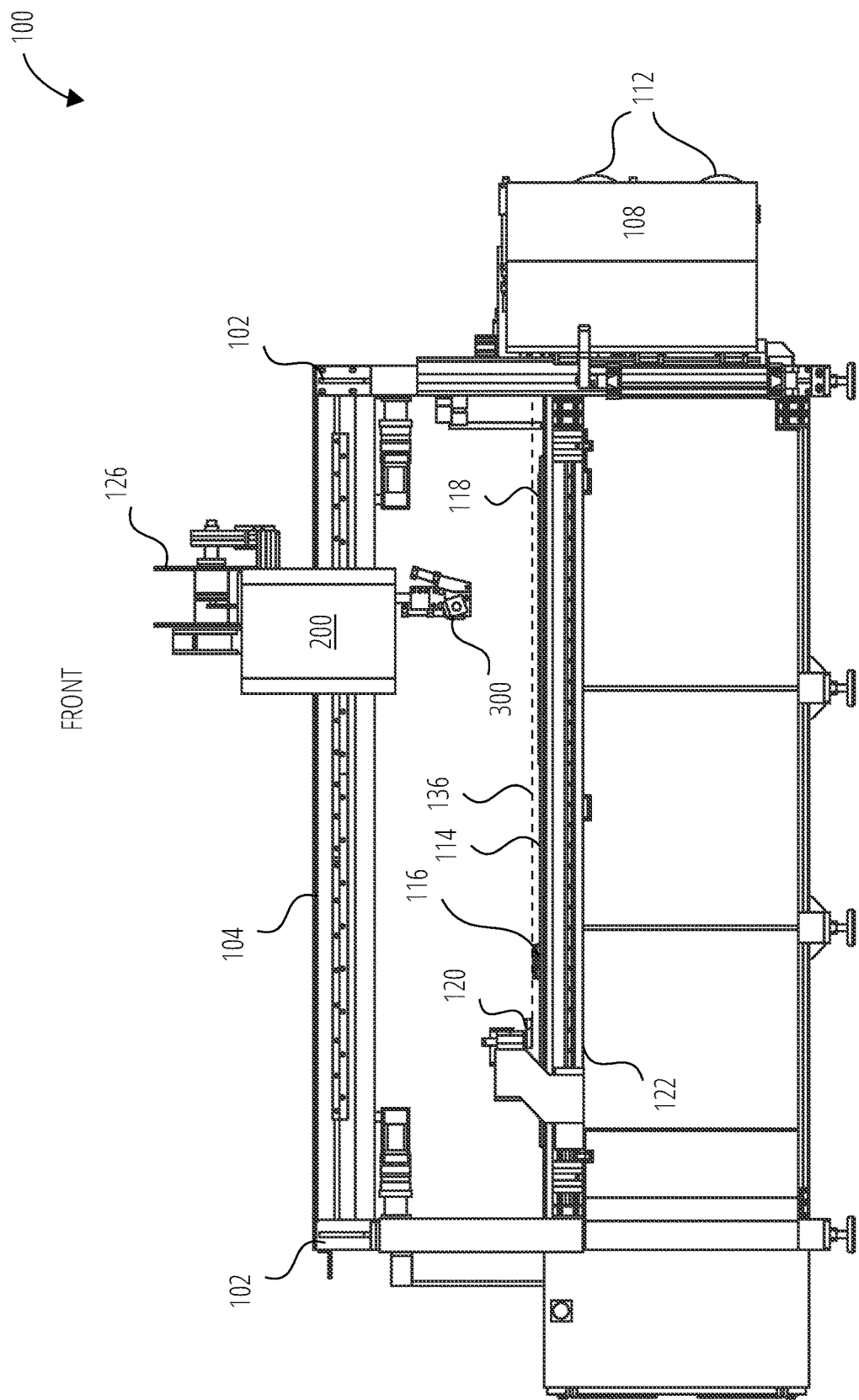
FIG. 1C depicts a front view of a frame splining system 100 in accordance with one embodiment.

FIG. 1C depicts a front view of a frame splining system 100 in accordance with one embodiment. In this view, substrate 136 is shown, after it has been engaged by the grabbing bar 120 and pulled across the frame 118 and work surface 114, such that the frame 118 is overlaid with the substrate 136 and ready for splining.

Figure 1D:
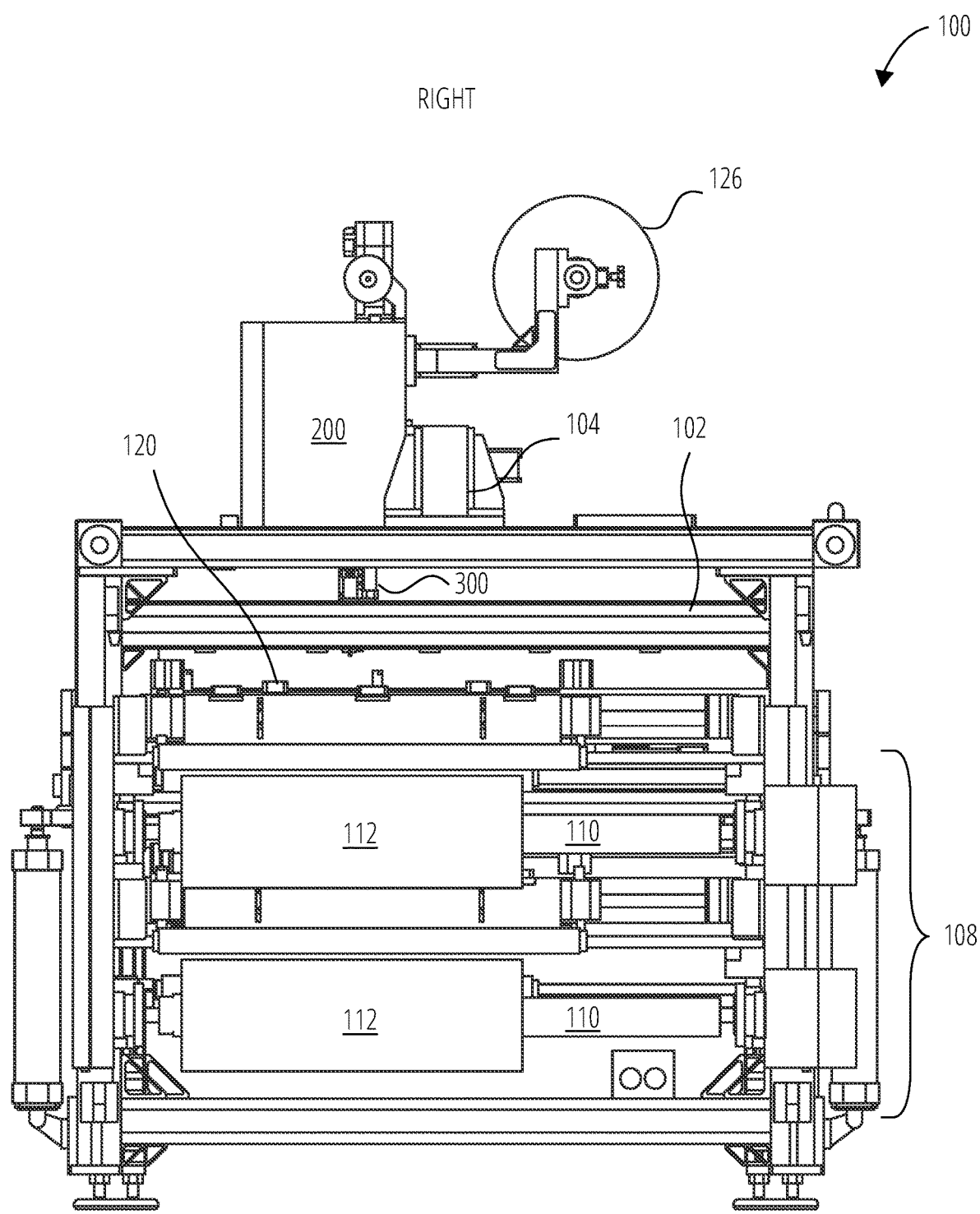
FIG. 1D depicts a right-side view of a frame splining system 100 in accordance with one embodiment.
Figure 1E:
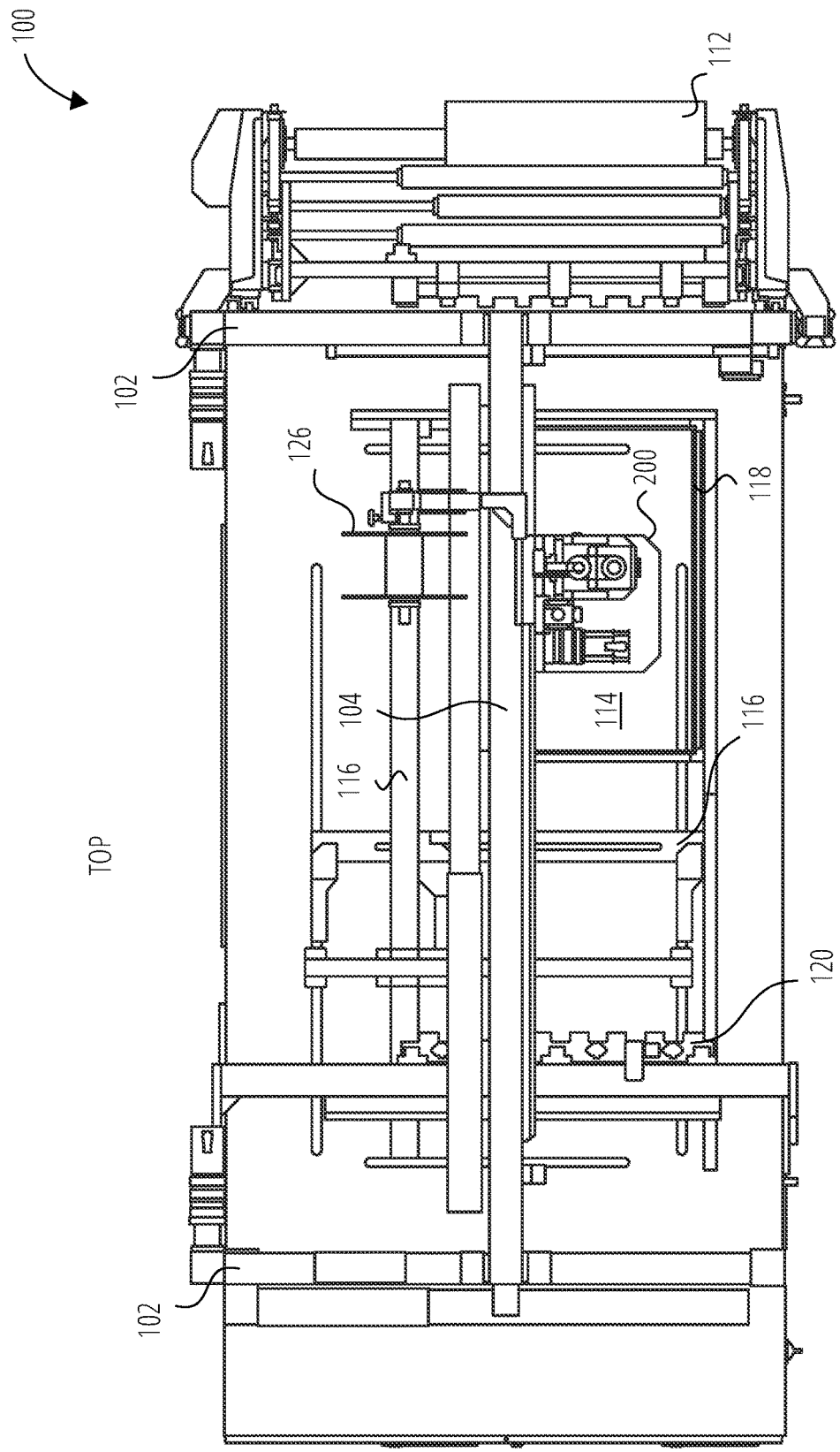
FIG. 1E depicts a top view of a frame splining system 100 in accordance with one embodiment.

FIG. 1D depicts a right-side view of a frame splining system 100 in accordance with one embodiment. FIG. 1E depicts a top view of a frame splining system 100 in accordance with one embodiment.

Figure 2:
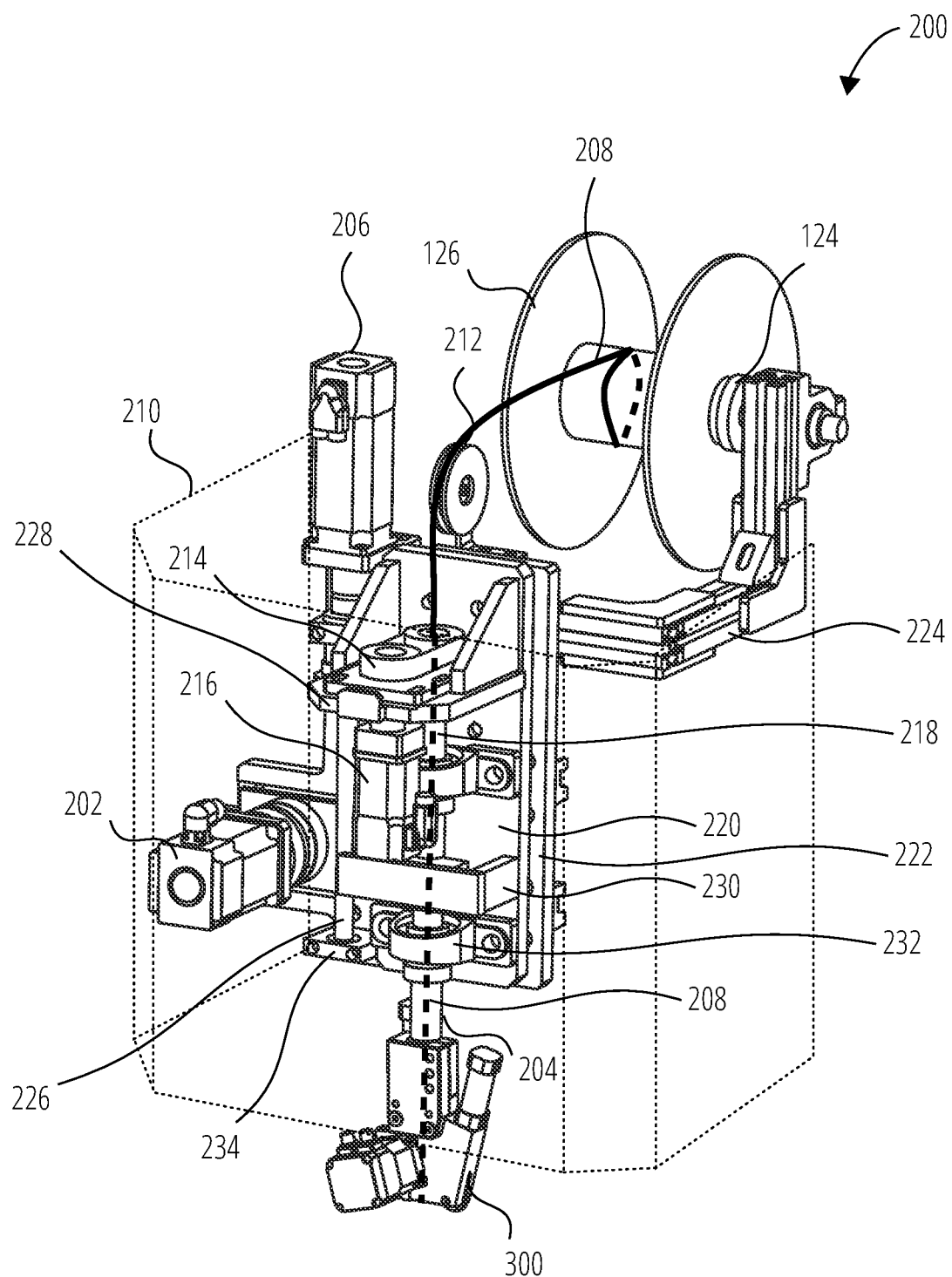
FIG. 2 depicts a splining head assembly apparatus 200 in accordance with one embodiment.

FIG. 2 depicts the splining head assembly apparatus 200 in greater detail. The splining head assembly apparatus 200 may comprise a spline spool pin 124, a spline spool 126, and a splining head 300, such as those introduced with respect to FIG. 1A and described in greater detail with regard to FIG. 3A through FIG. 3C. The splining head assembly apparatus 200 may further comprise a splining head drive motor 202, a vertical support 204, a vertical positioning actuator 206, a spline 208, a cover 210, a spline director 212, a splining head pivot belt 214, a splining head pivot actuator 216, a vertical support 218, a spline spool pin support arm 224, a top housing 220, a housing 222, a support 226, a support 228, a bracket 230, a bracket 232, and a bracket 234.

The splining head drive motor 202 may propel the splining head assembly apparatus 200 along the longitudinal gantry 104 introduced with respect to FIG. 1A. Through this action and that of the gantry drive motors 106 moving the longitudinal gantry 104 along the lateral gantries 102, the splining head assembly apparatus 200 may be moved across the horizontal plane and along the track of the frame. The vertical support 204 holds the splining head 300 vertically secure within the splining head assembly apparatus 200.

The vertical support 204 may be configured to rotate such that the splining head 300 may be repositioned as the track changes direction within the frame. In one embodiment, the vertical support 204 may rotate into four fixed positions, each ninety degrees apart, so as to change splining direction at each of the four corners of the track of a rectangular frame. In another embodiment, the vertical support 204 may freely rotate across three hundred and sixty degrees, and may continually change direction to accomplish splining of an arching or elliptical track or portions of the track. This may be accomplished in one embodiment through the action of the splining head pivot actuator 216. The splining head pivot actuator 216 may be a motor configured to induce revolutions of a splining head pivot belt 214 that in turn may rotate the vertical support 204 around its vertical axis, causing a rotation of the splining head 300. The vertical support 204 and splining head 300 may be configured such that this rotation does not twist the spline 208 enough to cause tension or distortion either within the splining head assembly apparatus 200 or once positioned and pressed into the frame. Such configuration will be well understood by one of ordinary skill in the art.

Through the action of the vertical positioning actuator 206, the splining head assembly apparatus 200 and thus the splining head 300 may be moved up and down vertically, so as to engage and disengage the splining head 300 with the frame track. The vertical positioning actuator 206 may be a solenoid, an air piston, some other type of linear actuator, or some other type of motive device capable of maintaining the splining head assembly apparatus 200 at a constant vertical height as it traverses the horizontal plane.

The spline spool 126 may hold a length of spline 208 in readiness to be fed into the track of the frame by the splining head 300. A spline spool 126 may hold a length of spline 208 long enough to assemble many spline frames. A spool may, for example, hold 250 feet (76 m) of spline, such that many frames may be assembled without needing to stop the frame splining system 100 and load a new spline spool 126 on the spline spool pin 124. The spline spool pin support arm 224 may support the spline spool pin 124 and spline spool 126 in a manner that keeps these elements stationary with respect to the other elements of the splining head assembly apparatus 200. The spline 208 may be fed from spline spool 126 to a spline director 212, which directs the spline 208 along an appropriate path while preventing the spline 208 from undergoing any tension that might deform the spline 208.

Spline may come in a number of standardized diameters such that frames of different makes and manufacturers may be splined with splines of different manufacturers, allowing a simpler and more streamlined and efficient assembly process for multiple types of frames. For example, frames of differing lengths, widths, and depths, may all be configured with tracks that accept 0.12-inch (3-mm) spline, while other frames may be configured to accept 0.18-inch (5-mm) spline. The elements of the splining head 300 may be designed to work with multiple spline sizes or may be interchangeable to accommodate individual spline sizes, as will be well understood by one skilled in the art.

Spline may be made of a malleable material such as rubber, intended to compress within the track for a tight fit. As such, tension on the spline may cause it to stretch, and thereby reduce in diameter. Such distortions may negatively impact the fit of the spline in the track, and thus the quality of the finished frame. A cover 210 may protect the elements of the splining head assembly apparatus 200 from impact as frames are placed and removed from the work surface.

Housing plates, supports, and brackets (220-234) may provide mechanical and structural support in accordance with the needs of the functional elements of the splining head assembly apparatus 200 described above. The configuration of thee elements shown here is not intended to be limiting, as one of ordinary skill in the art will appreciate.

Figure 3A:
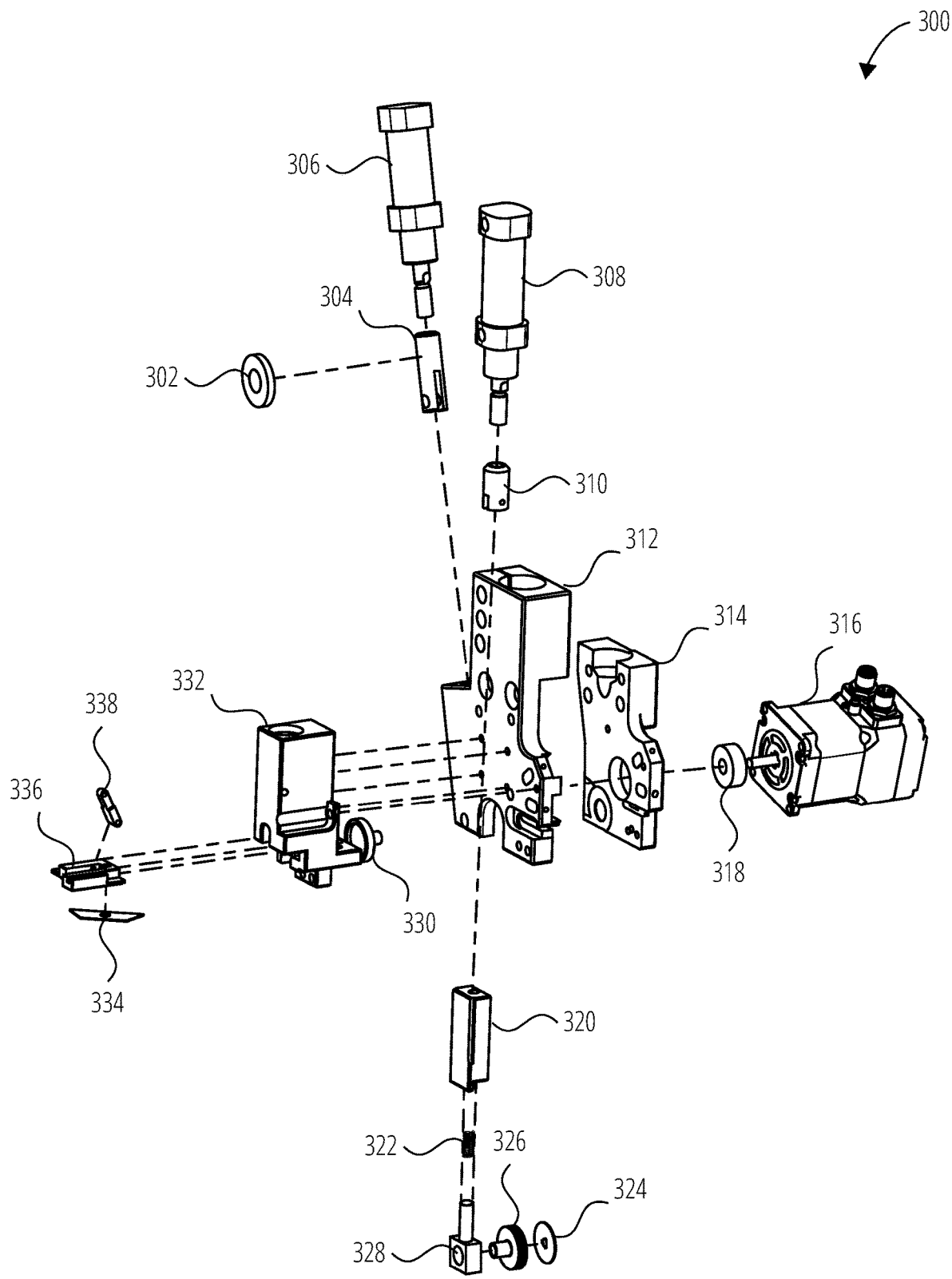
FIG. 3A illustrates an exploded view of a splining head 300 in accordance with one embodiment.

FIG. 3A illustrates an exploded view of a splining head 300 in accordance with one embodiment. The splining head 300 may comprise a pressing wheel 302, a pressing wheel guide 304, a pressing wheel actuator 306, a spline cutter actuator 308, a spline cutter guide 310, a housing 312, a top housing 314, a spline feeding motor 316, a stepper wheel 318, a spring housing 320, a spring 322, a substrate cutting wheel 324, a positioning wheel 326, a spline cutter slide 328, a front roller 330, a spline cutter housing 332, a spline cutter 334, a spline cutter slide 336, and a spline cutter arm 338. A number of fasteners, such as pins, screws, bolts, etc., may be used to assemble these elements as indicated by the dashed lines. Bearings may be used to facilitate the free movement of rotational parts. While these are not illustrated herein, one of ordinary skill in the art will readily apprehend the configurations and variations in which they may be used.

Figure 3B:
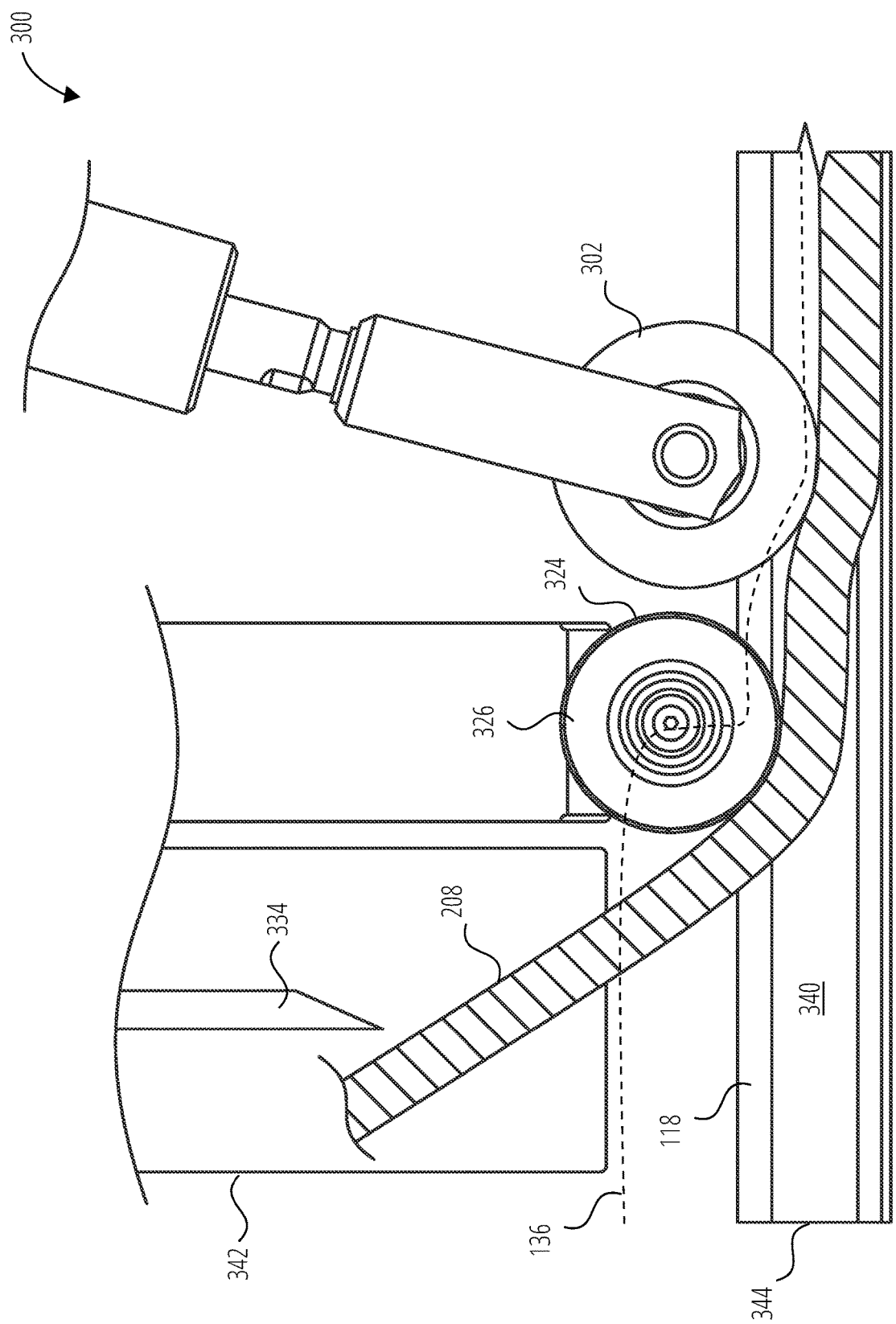
FIG. 3B and FIG. 3C depict details of a splining head 300 in accordance with one embodiment.
Figure 3C:
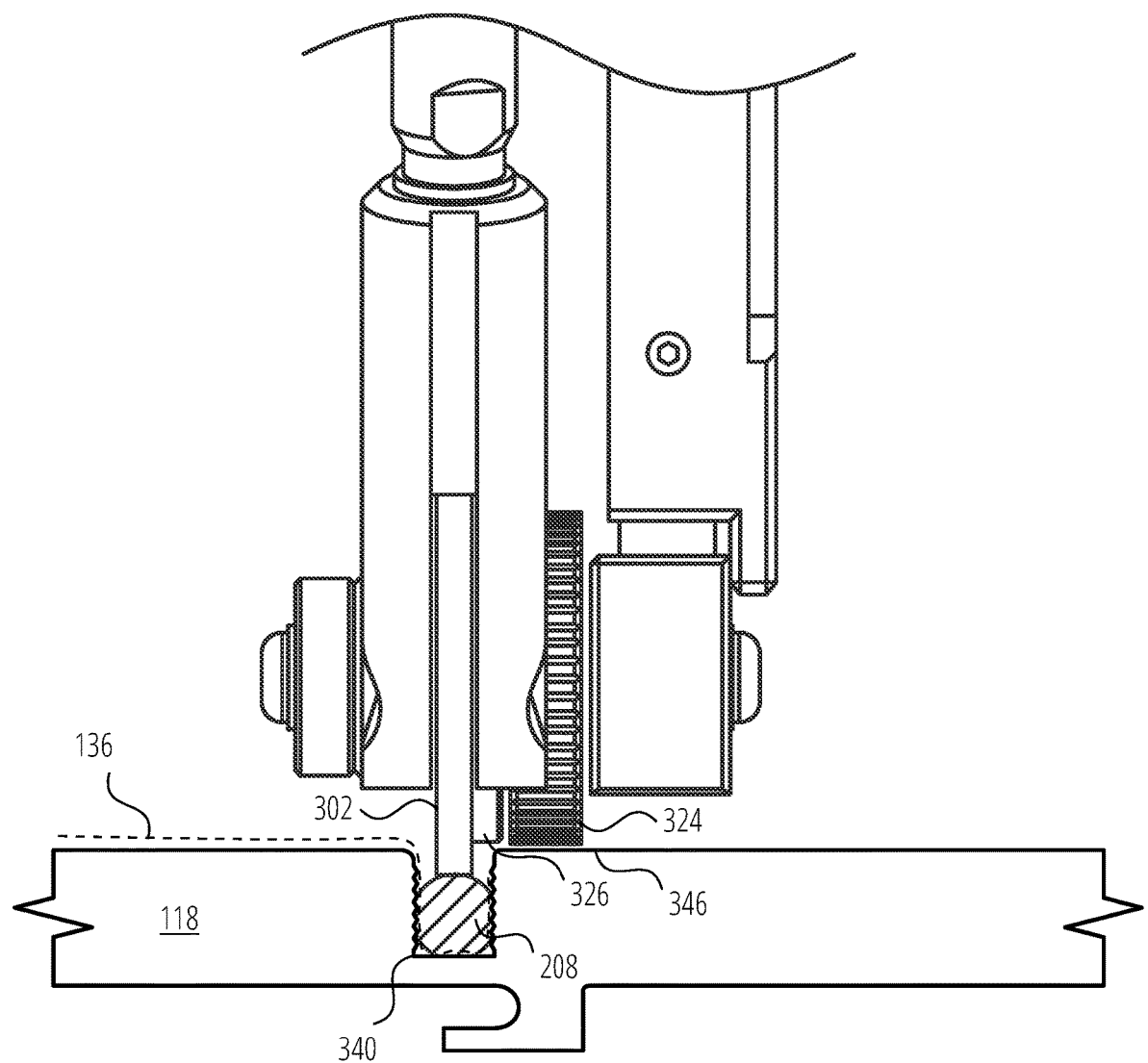

The pressing wheel 302 and pressing wheel guide 304 may act together to press spline into a track of a frame, as illustrated in FIG. 3B and FIG. 3C. The pressing wheel actuator 306 may provide an appropriate downward force upon the pressing wheel 302 in order to seat the spline within the track.

A spline cutter actuator 308 may act on the spline cutter 334 within the splining head 300 in order to cut the spline as the splining head assembly apparatus 200 and splining head 300 reach the end of the track in a frame being splined. In one embodiment, the spline may be cut at each corner. The spline cutter guide 310, the spring housing 320, the spring 322, the spline cutter slide 328, the spline cutter housing 332, the spline cutter slide 336, and the spline cutter arm 338 may be used to position and control the spline cutter 334 in a manner to configure the spline cutter 334 to cut the spline at appropriate points as the splining head 300 traverses a splined frame.

The housing 312 and top housing 314 may contain and attach to the other elements of the splining head 300 so as to appropriately protect and position these elements with respect to each other and the rest of the splining head assembly apparatus 200 and frame splining system 100. In one embodiment, the spline may run through a channel in the housing 312 such that it may be acted upon by the spline feeding motor 316 as well as the spline cutter 334.

The spline feeding motor 316 may propel the spline along the appropriate channel through the rotation of the stepper wheel 318, feeding spline to the splining head 300 at a constant rate without placing tension on the spline, stretching it, radially compressing it, or otherwise axially or radially distorting the spline. In one embodiment, the spline may run within the vertical support 204 from the spline director 212 introduce in FIG. 2 to the splining head 300.

The substrate cutting wheel 324 and positioning wheel 326 be rotated in coordination with a front roller 330 in order to position the spline and cut the substrate as is illustrated in greater detail in FIG. 3B and FIG. 3C.

FIG. 3B and FIG. 3C depict the splining head 300 in more detail according to one embodiment. The positioning wheel 326 may position the spline 208 along the track 340 within a frame 118, as shown. The spline 208 may be fed through a spline feeding mechanism 342 such that it may be positioned along the track without any axial or radial distortion of the spline 208. A substrate cutting wheel 324 may run along the outer edge of the frame 346 and may cut through substrate 136. In one embodiment, the substrate cutting wheel 324 may cut partially through the depth of the substrate 136, leaving part of the substrate depth uncut, so that the substrate 136 may be weakened enough for excess to be cleanly removed, without cutting completely through the substrate and potentially scratching, marring, or otherwise damaging the frame 118. In one embodiment, the positioning wheel 326 and the substrate cutting wheel 324 are coaxial, as shown. In this manner, substrate 136 may be cut at the same time as the spline is positioned.

The positioning wheel 326 and substrate cutting wheel 324 may be configured to run ahead of a pressing wheel 302. The pressing wheel 302 may be of larger diameter, may be set at a lower vertical height, or may otherwise be configured to press the spline 208 down such that it is fully seated within the track 340. In some embodiments, the track 340 may have ridges along its sides or a lip at its top edge, such that an inserted spline 208 may not be easily dislodged. Just as additional force may be needed to remove a spline 208 from such a track 340, additional force may be needed to press the spline 208 into such a track 340, as will be well understood by those skilled in the art. A pressing wheel actuator 306, as introduced with respect to FIG. 2, may be used to exert a consistent downward force at the pressing wheel 302, such that the spline 208 is fully seated in track 340. The pressing wheel actuator 306 may also allow the pressing wheel 302 vertical position to be varied in one embodiment. In another embodiment, variation in pressing wheel 302 height may be adjusted by using a different diameter pressing wheel 302 for different spline sizes.

By virtue of the pressing wheel 302 following the substrate cutting wheel 324, as the spline 208 is pressed into the track 340, the cut edge of the substrate 136 may also be pressed into the track 340. This is indicated in FIG. 3C. Retracting the cut substrate edge into the frame represents a benefit over conventional solutions. Waste of substrate may be reduced. Tearing and dislodgment of the substrate from the frame through snagging the loose edge may be prevented. Where substrate material may have sharp edges, this edge retraction may also prevent injury to those handling the assembled frames.

The spline feeding mechanism 342 may incorporate or be adjacent to a spline cutter 334. The spline cutter 334 may be controlled by the spline cutter actuator 308 previously introduced in order to cut the spline 208 at the end of a portion of the track 344, such as at the corners of the track 340, when approaching the portion of the track where splining began, or as otherwise necessitated by a particular action or embodiment. In one embodiment, the spline cutter 334 may be a single sharp blade. In another embodiment, the spline cutter 334 may incorporate opposing blades which the spline 208 is pinched between. A laser or other cauterizing element, or any other severing device may be used to sever the spline 208 cleanly at a predetermined point along the track 340, as will be well understood by one skilled in the art.

Figure 4:
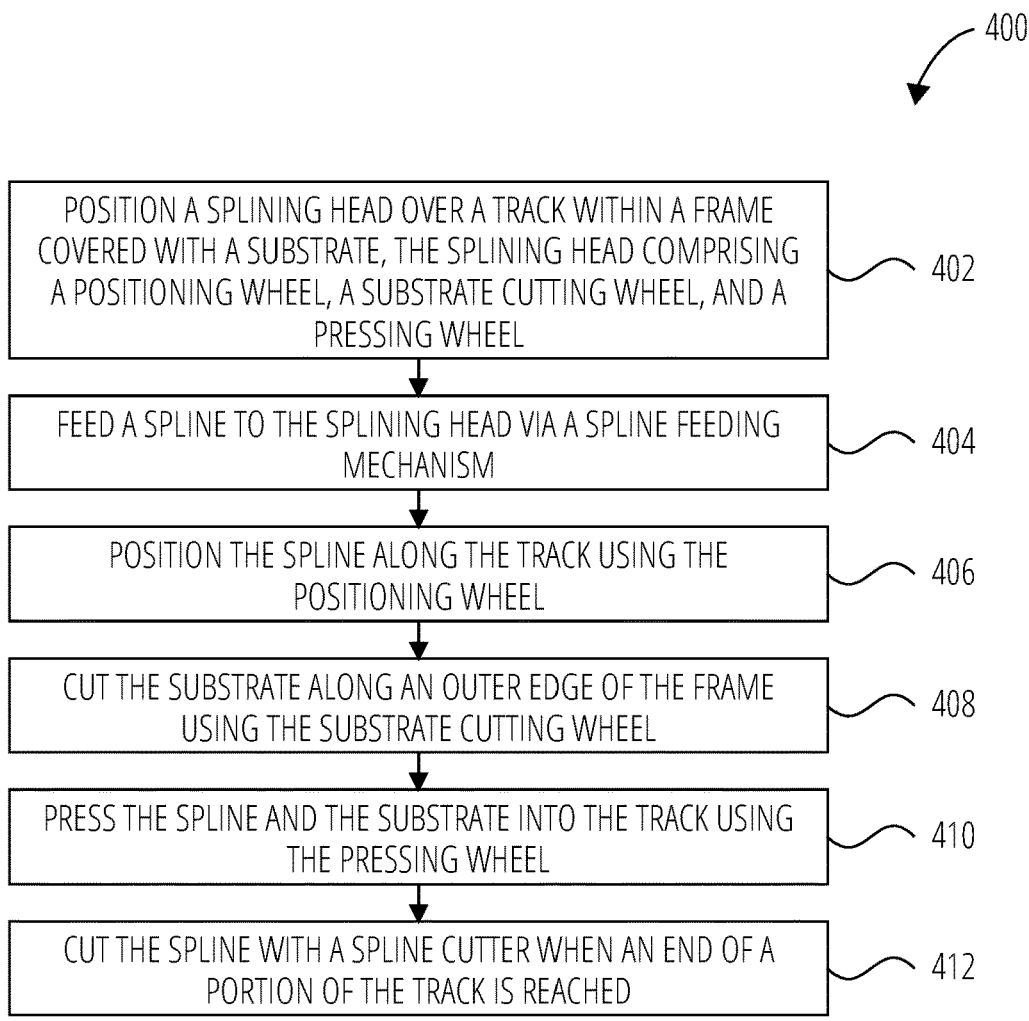
FIG. 4 illustrates a routine 400 in accordance with one embodiment.

FIG. 4 illustrates a routine 400 that may be performed by the disclosed splining head assembly apparatus, such as the splining head assembly apparatus 200 previously described. In block 402, a splining head, such as the splining head 300 illustrated in detail in FIG. 3B and FIG. 3C, may be positioned over a track within a frame covered with a substrate. The splining head may comprise a positioning wheel, a pressing wheel, and a substrate cutting wheel.

In block 404, a spline may be fed to the splining head via a spline feeding mechanism. In one embodiment, the spline may be held on and fed from a spline spool, such as that introduced with respect to FIG. 1A. Spline may vary in diameter as is appropriate to the tracks of frames being splined. Spline may be made from various materials, but may commonly be of an elastic material such as rubber.

In block 406, the positioning wheel positions the spline within the track. In block 408, the substrate cutting wheel cuts the substrate along an outer edge of the frame. In one embodiment, the positioning wheel and the substrate cutting wheel may be coaxial, such that the spline positioning and substrate cutting occur at the same time.

In block 410, the spline and the cut substrate edge may be pressed into the track using the pressing wheel. This may prevent the free edge of the substrate from snagging on objects and being damaged or displaced from the track. This may also prevent sharp-edged substrates from causing injury to those handling the assembled frames.

In block 412, a spline cutter may cut the spline when an end of the track is reached. In one embodiment, spline may be cut at the corners of a track. The spline cutter may be the spline cutter 334 previously described and may be actuated by the afore-described spline cutter actuator.

In one embodiment, the splining head assembly apparatus may be incorporated into a frame splining system, such as the frame splining system 100 illustrated in FIG. 1A-FIG. 1E. The method may then also include scanning the frame to discover its frame dimensions. A substrate spool carrying an appropriately sized substrate may be selected from among a plurality of substrate spools configured in a substrate carousel based on the frame dimensions. The substrate carousel may be mechanically repositioned to present the substrate spool carrying the appropriately sized substrate for use. The method may also include advancing a grabbing bar along a grabbing bar rail to engage with the substrate on a substrate spool and covering the frame with the substrate by retracting the grabbing bar along the grabbing bar rail to draw the substrate across a work surface holding the frame.

In one embodiment, positioning the spline within the track and cutting the substrate along the outer edge of the frame may be performed at the same time, because the positioning wheel and the substrate cutting wheel are configured coaxially. The substrate cutting wheel may be configured to cut through less than the entire depth of the substrate, in order to prevent any scratching, cutting, marring, or other damage to the frame. The method may further include tearing away excess substrate along the cut substrate edge. Other technical features may be readily apparent to one skilled in the art from the following figures, descriptions, and claims.

LISTING OF DRAWING ELEMENTS 100 frame splining system
102 lateral gantry 104 longitudinal gantry
106 gantry drive motor
108 substrate carousel
110 substrate spool pin
112 substrate spool
114 work surface
116 frame securement clamp
118 frame
120 grabbing bar
122 grabbing bar rail
124 spline spool pin
126 spline spool
128 grabbing bar motion
130 scanning device
132 control station
134 controller
136 substrate
200 splining head assembly apparatus
202 splining head drive motor
204 vertical support
206 vertical positioning actuator
208 spline
210 cover
212 spline director
214 splining head pivot belt
216 splining head pivot actuator
218 vertical support
220 top housing
222 housing
224 spline spool pin support arm
226 support
228 support
230 bracket
232 bracket
234 bracket
300 splining head
302 pressing wheel
304 pressing wheel guide
306 pressing wheel actuator
308 spline cutter actuator
310 spline cutter guide
312 housing
314 top housing
316 spline feeding motor
318 stepper wheel
320 spring housing
322 spring
324 substrate cutting wheel
326 positioning wheel
328 spline cutter slide
330 front roller
332 spline cutter housing
334 spline cutter
336 spline cutter slide
338 spline cutter arm
340 track
342 spline feeding mechanism
344 end of a portion of the track
346 outer edge of the frame
400 routine
402 block
404 block
406 block
408 block
410 block
412 block Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. Thus, an entity described or recited as "configured to" perform some task refers to something physical. The term "configured to" is not intended to mean "configurable to." Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of this disclosure as claimed. The scope of disclosed subject matter is not limited to the depicted embodiments but is rather set forth in the following Claims.

What is claimed is:

1. A splining head assembly apparatus, comprising:
    a splining head; and
    a spline feeding mechanism configured to feed a spline to the splining head,
    the splining head comprising:
        a positioning wheel configured to position the spline along a track in a frame overlaid with a substrate;
        a substrate cutting wheel configured to cut the substrate along an outer edge of the frame; and
        a pressing wheel configured to press the spline and the substrate into the track in the frame,
        wherein the splining head is configured such that the positioning wheel and the substrate cutting wheel run ahead of the pressing wheel on the outer edge of the frame, and
        wherein the positioning wheel and the substrate cutting wheel are configured to be coaxial, such that the spline is positioned and the substrate is cut at the same time.

2. The splining head assembly apparatus of claim 1, wherein the spline feeding mechanism comprises a spline feeding motor configured to feed the spline to the splining head in a manner that minimizes axial and radial distortion of the spline.

3. The splining head assembly apparatus of claim 1, further comprising:
    a spline spool pin configured to hold a spline spool wound with the spline.

4. The splining head assembly apparatus of claim 1, wherein the substrate cutting wheel is positioned to cut partially through a substrate depth, leaving part of the substrate depth uncut.

5. The splining head assembly apparatus of claim 1, further comprising:
    a pressing wheel actuator configured to exert a consistent downward force on the pressing wheel to fully seat the spline and substrate into the track in the frame.

6. The splining head assembly apparatus of claim 1, the splining head further comprising:
    a spline cutter configured to cut the spline at an end of a portion of the track; and
    a spline cutter actuator configured to engage the spline cutter to cut the spline.

7. A frame splining system, comprising:
    a work surface configured to receive and support a frame having a track for spline;
    at least one frame securement clamp configured to hold the frame immobile against the work surface;
    a splining head assembly apparatus, comprising:
        a splining head; and
        a spline feeding mechanism configured to feed the spline to the splining head,
    the splining head comprising:
        a positioning wheel configured to position the spline along the track in the frame overlaid with a substrate;
        a substrate cutting wheel configured to cut the substrate along an outer edge of the frame; and
        a pressing wheel configured to press the spline and the substrate into the track in the frame,
        wherein the splining head is configured such that the positioning wheel and the substrate cutting wheel run ahead of the pressing wheel on the outer edge of the frame, and
        wherein the positioning wheel and the substrate cutting wheel are configured to be coaxial, such that the spline is positioned and the substrate is cut at the same time.

8. The frame splining system of claim 7, further comprising:
    a scanning device capable scanning portions of the track frame for at least one of:
        a barcode;
        a quick response code;
        an informational label; and
        an image of the frame; and
    a controller configured to determine frame dimensions based on input from the scanning device.

9. The frame splining system of claim 7, wherein the substrate cutting wheel of the splining head of the splining head assembly apparatus is positioned to cut partially through a substrate depth, leaving part of the substrate depth uncut.

10. The frame splining system of claim 7, the spline feeding mechanism of the splining head assembly apparatus further comprising a spline feeding motor configured to feed the spline to the splining head in a manner that minimizes axial and radial distortion of the spline.

11. The frame splining system of claim 7, the splining head assembly apparatus further comprising a spline spool pin configured to hold a spline spool wound with the spline.

12. The frame splining system of claim 7, the splining head assembly apparatus further comprising a pressing wheel actuator configured to exert a consistent downward force on the pressing wheel to fully seat the spline and substrate into the track in the frame.

13. The frame splining system of claim 7, the splining head of the splining head assembly apparatus further comprising:
    a spline cutter configured to cut the spline at an end of a portion of the track; and
    a spline cutter actuator configured to engage the spline cutter to cut the spline.

14. The frame splining system of claim 7, further comprising:
    a plurality of substrate spool pins;
    a substrate carousel configured to selectively align one of the plurality of substrate spool pins with the work surface; and a grabbing bar configured to:
   advance along a grabbing bar rail to engage the substrate from a substrate spool mounted on the one of the plurality of substrate spool pins aligned with the work surface; and
   retract along the grabbing bar rail to draw the substrate across the work surface.

15. The frame splining system of claim 7, further comprising:
   a longitudinal gantry supporting the splining head assembly apparatus;
   at least one lateral gantry supporting the longitudinal gantry;
   a gantry drive motor configured to propel the longitudinal gantry along the at least one lateral gantry; and
   the splining head assembly apparatus further comprising:
      a rotatable vertical support configured to rotate the splining head and maintain the splining head at a constant vertical height with respect to the frame;
      a splining head drive motor configured to propel the splining head assembly apparatus along the longitudinal gantry; and
      a vertical positioning actuator configured to adjust a vertical position of the splining head assembly apparatus with respect to the work surface.

* * * * *